Figure 1:
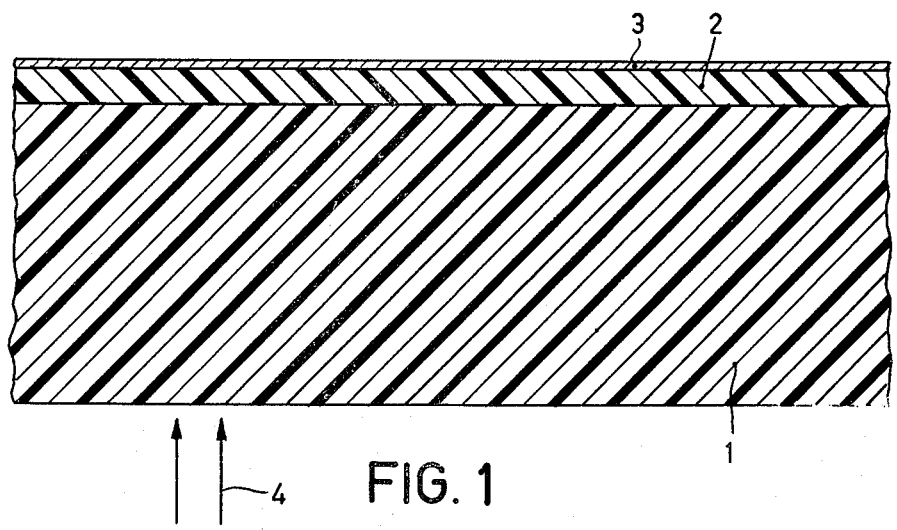

United States Patent [19]

de Bont et al.

[11] 4,230,939

[45] Oct. 28, 1980

[54] INFORMATION-RECORDING ELEMENT HAVING A DYE-CONTAINING AUXILIARY LAYER

[75] Inventors: Marinus R. J. de Bont; Petrus J. Kivits; Cornelis J. Schoot; Pieter Zalm, all of Eindhoven, Netherlands

[73] Assignee: U.S. Philips Corporation, New York, N.Y.

[21] Appl. No.: 946,987

[22] Filed: Sep. 29, 1978

[30] Foreign Application Priority Data

Sep. 29, 1977 [NL] Netherlands .......................... 7710634
Sep. 8, 1978 [NL] Netherlands .......................... 7809159

[51] Int. Cl.² ...................... G06K 19/02; G06K 7/00; G01D 15/10
[52] U.S. Cl. ................................... 235/488; 346/76 L
[58] Field of Search .................. 346/76 R, 76 L, 135, 346/150; 235/488, 469, 470; 250/568, 569, 570; 340/149 A

[56] References Cited

U.S. PATENT DOCUMENTS

| | | | |
|---|---|---|---|
| 3,560,994 | 2/1971 | Wolfe | 346/76 L |
| 3,665,483 | 5/1972 | Becker | 346/76 L |
| 3,787,873 | 1/1974 | Sato | 346/76 L |
| 3,889,272 | 6/1975 | Lou | 346/135 |
| 4,000,492 | 12/1976 | Willens | 346/76 L |
| 4,101,907 | 7/1978 | Bell | 346/76 L |

*Primary Examiner*—Robert M. Kilgore
*Attorney, Agent, or Firm*—Thomas A. Briody; William J. Streeter; Algy Tamoshunas

[57] ABSTRACT

The invention provides an information-recording element in which information can be written and read optically. The element is constructed from a transparent substrate, a laser light-absorbing, dye-containing auxiliary layer provided thereon, as well as a laser light-reflecting recording layer present on the auxiliary layer. Upon recording information the element is exposed to pulsated laser light via the substrate, holes being formed in the recording layer. The auxiliary layer stimulates the formation of holes, a saving of laser light energy being obtained. In a favorable embodiment the auxiliary layer has a laser light absorption of from 20 to 80% and a maximum thickness of 2500 Å. In a further favorable embodiment the auxiliary layer also comprises an endothermal material, for example, nitrocellulose having a nitrogen content of at least 11%.

6 Claims, 2 Drawing Figures

INFORMATION-RECORDING ELEMENT HAVING A DYE-CONTAINING AUXILIARY LAYER

The invention relates to an information recording element in which information can be written and read optically, which comprises a transparent substrate, an auxiliary layer provided on the substrate, as well as an information-recording layer which is provided on the auxiliary layer having a reflective power with respect to a laser light beam used for writing or reading.

Such an information-recording element is disclosed in German Auslegeschrift 2,514,678. According to FIG. 2B of the Auslegeschrift, the element is exposed to laser light via the substrate, which light is modulated in accordance with the information to be written. As a result of the exposure, substantially circular holes having a very small diameter are formed in the information-recording layer which will hereinafter be briefly termed recording layer. The holes are formed in that in the exposed places the material of the recording layer melts as a result of absorption of the amplitude-modulated laser light and the molten material retracts by surface phenomena in an edge-like manner, an aperture or hole being formed. The recording element disclosed in the above-mentioned Auslegeschrift is constructed from a flexible transparent polyester substrate, an anti-reflection layer of $Bi_2S_3$, $As_2S_3$ or Se provided thereon, and a metallic recording layer of Bi, Ind or Sn provided on the anti-reflection layer. By using an anti-reflection layer the percentage of laser light which is absorbed by the recording layer is increased and the overall amount of laser energy which is necessary to form a hole of the desired dimensions in the recording layer is reduced.

If an anti-reflection laser is used it should be borne in mind that not all anti-reflection material are suitable. There is a significant coherence between the properties of anti-reflection layer, recording layer and substrate layer. For example, the above-mentioned Ausleges-chrift mentions three discrete anti-reflection materials in combination with three discrete recording materials. In this connection reference may also be made to Netherlands Pat. Application No. 7,702,971, published on Sept. 21, 1977, which discloses an information-recording element which is constructed from a substrate and a thin layer of a strongly reflecting material provided thereon, for example, a vapor-deposited aluminum layer, which in turn is coated with a strongly light-absorbing material, for example, a vapor-deposited organic dye. The element is exposed to pulsatory laser light on the side of the absorption layer, holes being formed in the absorption layer by evaporation of the absorption layer in the exposed places. Such a thickness of the absorption layer is preferably chosen that the whole system is brought in an anti-reflex condition so that the energy loss by reflection is minimized. On pages 11 and 12 of the above-mentioned Netherlands Patent Application the coefficient of reflection of such a system is computed on the basis of formulae in which inter alia the complex Fresnel's reflection coefficients of the various layers as well as the thicknesses thereof are used as parameters.

The use of an anti-reflection layer according to the above-mentioned Auslegeschrift has the disadvantage that the choice of anti-reflection layer and recording layer is restricted while in addition the anti-reflection layer must be provided accurately, that is to say with small variations in thickness.

It is the object of the invention to provide an information-recording element in which the amount of laser light energy required for writing information in the recording layer is reduced by using an auxiliary layer and in which an ample choice of material of both the auxiliary layer and the recording layer is possible. This object is achieved with an information-recording element of the kind mentioned in the preamble which is characterized in that the auxiliary layer is a laser light-absorbing dye-containing layer.

In contrast with the device described in the above-mentioned Netherlands Patent Application No. 7,702,971, the light-absorbing dye-containing layer in the information-recording element according to the invention is enclosed between substrate and recording layer. The light-absorbing layer in the element according to the invention is an auxiliary layer or activating layer which stimulates the formation of holes in the radiation-reflecting recording layer. No holes are formed in the radiation-reflecting layer of the known device. This layer may be considered as an auxiliary layer for the radiation-absorbing recording layer. As compared with the device known from the above-mentioned Netherlands Patent Application, the information-recording element embodying the invention presents the advantage that the information can be written and read by exposure via the substrate. Herewith it is achieved that the defects, for example, scratches, pits, humps and dust particles, present on or in the surface of the substrate fall beyond the depth of focus of the objective which focuses the laser light on the recording layer so that the defects do not adversely influence the quality of the information to be written and read in particular do not cause any noise during reading information. The defects have the same or larger dimensions than the holes (image points) formed in the recording layer which have a diameter of approximately 0.5 $\mu$m to 1 $\mu$m.

In connection with the above-mentioned depth of focus the transparent substrate has a minimum thickness of approximately 300 $\mu$m and preferably a thickness of approximately 1 mm so as to obtain a sufficient mechanical rigidity. The substrate is manufactured from a transparent synthetic resin, for example, polymethylmethacrylate, polycarbonate, polysulphone, PVC or from glass.

Upon writing or recording information a laser light beam which is intensity modulated in accordance with the information and has a pulse time of, for example, $5 \times 10^{-7}$ sec. is incident via the substrate. The laser light beam passes the substrate, traverses the auxiliary layer, in which a part of the laser light is absorbed dependent on the composition of the auxiliary layer, is then reflected against the recording layer, in which a part of the laser light is absorbed also dependent on the absorption-reflection characteristic of the recording layer. The reflected light again passes the auxiliary layer, is partly absorbed and ultimately leaves the element on the side of the substrate. As a result of the absorption of energy in the auxiliary layer and in the recording layer, the temperature of said layers will increase until the recording layer melts in the exposed places and a hole forms in the recording layer as well as in the auxiliary layer as a result of decomposition and evaporation of the auxiliary layer in the exposed places.

In a preferred form of the element in accordance with the invention an auxiliary layer is used which has a laser light absorption of from 20 to 80% and a maximum thickness of 2500 Å.

A very suitable layer thickness of the auxiliary layer is from 300 to 1000Å.

The element according to the invention results in a significant saving of laser energy of at least 20%. With comparatively thick auxiliary layers the energy saving is smaller than when comparatively thin auxiliary layers are used due to the necessary heating of the auxiliary layer by the laser light. The saving is also smaller when auxiliary layers having a comparatively low absorption of laser light are used than when auxiliary layers are used which show a comparatively high absorption of laser light.

The absorption of the auxiliary layer can be calculated by means of Lambert's Beer's law which, although applying to solutions of dyes, permits of nevertheless obtaining a good approach of the solid layer absorption of the auxiliary layer in the element embodying the invention. According to this law the optical density (OD) is equal to the product of the molecular extinction coefficient ($\epsilon$), the dye concentration (c) expressed in mol/l and the thickness (d) expresed in cm.

In a further favorable embodiment the auxiliary layer has a laser light absorption of from 20 to 50%.

This embodiment is not so much directed to obtaining a maximum saving of laser light, but does present the interesting possibility of reading the element embodying the invention via the substrate in reflection. As already said, the element embodying the invention can be read via the substrate. In this case there exist two possibilities, namely reading in transmission and in reflection. When reading in transmission, the scanning laser light beam which of course is much less intense than the recording laser light beam and, for example, is a factor 10 weaker, passes the substrate and the holes present in the auxiliary layer and in the recording layer and is received on the side remote from the substrate and processed in the playback (reading) apparatus. When reading in reflection, the scanning beam passes the substrate and the remaining parts of the auxiliary layer, is reflected against the recording layer, again passes the auxiliary layer and the substrate and is received on the side of the substrate and further processed.

The advantage of reading in reflection is that fewer optical elements, for example objectives, are required in the recording apparatus because the reflected beam traverses substantially the same light path in the reverse direction as the scanning beam. A second advantage is that errors as a result of vibrations in the optical system, for example objective vibrations, are partly compensated for.

In the above-mentioned favorable embodiment, sufficient laser light is reflected for processing in the optical system. Generally, at least 20% and preferably at least 30% of the amount of light of the scanning beam is required for this purpose. In a preferred form the auxiliary layer used in the element embodying the invention comprises an organic dye or a solution or dispersion of an organic dye in a polymeric binder.

Such an auxiliary layer has a very low thermal conductivity so that the thermal energy formed in the auxiliary layer as a result of light absorption also is optimally in favor of the heating of the layer in the exposed places. The flowing away of thermal energy to the non-exposed places and to the atmosphere is suppressed. In this connection it is to be noted that the anti-reflection layer of inorganic material according to the above-described German Auslegeschrift 2,514,678 has a considerably higher thermal conductivity.

The organic dye must preferably show an absorption maximum at the wavelength of the laser light used and must also have a high molar extinction coefficient, so that the desired absorption can be realized in a thin layer.

suitable dyes are, for example, rhodamines such as Thodamin-B and Rhodamine-6G, xanthenes, for example Pyromine-B and Pyromine-G, acridines, for example Acriflavine, bisphenylmethane dyes, for example, Auramine and Michler's Hydrol Blue, triphenylethane dyes, for example, Malachit Green and Crystal Violet, as well as cyanine chromogenic dyes, for example monomethines, trimethines and pentamethines.

Suitable polymeric binders are, for example, cellulose, polystyrene, polyester, polether, polyacrylate, polymethylacrylate, polycarbonate, polyamine, polyvinylalcohol, polyvinylchloride, and copolymers of vinylchloride/vinylacetate. An auxiliary layer which consists of dye can simply be provided by means of a vapor-deposition process.

An auxiliary layer which contains a solution or dispersion of the dye in a polymeric binder can be provided on the substrate according to methods which are known per se. For example, a solution of the binder in a suitable solvent, in which solution a dye has also been dissolved or dispersed, can be provided on the substrate surface by means of a pouring, spraying or centrifuging process and the solvent may then be evaporated. A suitable organic solvent is, for example, an alcohol, for example butanol, glycol, methylglycol, an aromatic hydrocarbon, for example, benzene, toluene, a ketone, for example acetone, cyclohexanone, an ester, for example butyl acetate and furthermore tetrahydrofuran and dimethylformamide.

When a dispersion of dye in the polymeric binder is used, the particle size of the dye may not be more than approximately 200 Å. A centrifuging process is to be understood to mean a method in which a quantity of the liquid to be provided is disposed centrally on the substrate after which the liquid is uniformly distributed over the whole surface by rotation of the substrate.

In a further preferred embodiment the auxiliary layer comprises a polymeric binder which is formed by a radiation-polymerized lacquer on the basis of radiation-sensitive monomers and/or oligomers in which the dye is dissolved or finely divided.

Very suitable are the UV light-polymerizable thin liquid mixtures of monoesters, diesters, triesters or tetraesters of acrylic acid. This applies in particular to U.V. light-curable light-sensitive lacquers containing 40–90% by weight of a monoacrylate, 5–50% by weight of a diacrylate, triacrylate, or tetraacrylate, as well as 0.5–3% by weight of a light-sensitive initiator.

A suitable light-sensitive initiator is a benzoin derivative, for example, benzoin isobutyl ether, also known commercially as Vicure.

Examples of suitable acrylic acid esters are monoacrylates, for example, alkyl acrylates, alkoxy alkyl acrylates, phenoxy alcyl acrylates and phenyl acrylates, for example, ethyl acrylate, n-butyl acrylate, hexyl acrylate, octyl acrylate, 2-ethylhexyl acrylate, octadecyl acrylate, ethoxyethyl acrylate and phenoxyethyl acrylate; diacrylates, for example, alcane-diol diacrylates and alkene glycol diacrylates, for example, 1,3- propanediol diacrylate, diethyleneglycol diacrylate and tetraethylene-glycol diacrylate; triacrylates, for example, trimethylolpropane triacrylate and pentaerytritol triacrylate; tetraacrylates, for example, pentaerytriol tetraacrylate as well as oligomeric acrylic acid esters, for example, polyethylene glycol acrylate and epoxy acrylate.

Also readily useful lacquers are those containing a mixture of a radiation-linkable polyene compound which contains per molecule two or several ethylene groups (—CH=CH—) and a polythiol compound which contains per molecule two or more thiol groups (—SH).

Polythiol compounds and polyene compounds are sufficiently known from literature and are commercially available. Reference may be made, for example, to the U.S. Pat. Nos. 3,697,395, 3,697,396, 3,697,397 and 4,008,341.

As regards specific lacquer compositions, reference may be made to U.S. Patent Applications Ser. No. 774,973, filed Mar. 7, 1977, now abandoned in favor of Ser. No. 887,188, filed Mar. 16, 1978 and Applicant's Ser. No. 926,952, filed July 20, 1978.

The advantage of an auxiliary layer containing radiation-polymerized substances is that the layer can be provided on the substrate surface by means of a matrix so that the substrate-remote surface of the auxiliary layer is particularly readily defined and consequently the recording layer provided on this surface also has a defined structure. It will be obvious that a readily defined "interface" between auxiliary layer and recording layer, which interface falls within the depth of focus of the objective focusing the laser light during writing or reading information, is of importance to obtain a good information quality.

More particularly, the auxiliary layer is provided by providing a matrix surface with a layer of radiation-curable lacquer in which a dye is incorporated, providing a substrate on the layer of lacquer, radiation curing the lacquer layer via the substrate or via the matrix, and removing from the matrix the assembly of substrate and cured dye-containing lacquer layer connected thereto.

When exposure is carried out via the matrix, the latter should be transparent to the radiation used, for example UV light, and be manufactured, for example, from glass. A very suitable non-transparent matrix is a nickel matrix, the surface of which has been polished to be very smooth.

In a particularly interesting embodiment of the element according to the invention the auxiliary layer also comprises an endothermal material. Upon exposure to laser light, as soon as the decomposition temperature of the endothermal material in the auxiliary layer has been reached, said material will decompose while giving off energy. The chemical energy of the endothermal material is converted, via the exothermal decomposition reaction, into caloric energy (thermal energy) and potential energy (pressure build-up). As a result of this, holes will be formed in the recording layer and in the auxiliary layer in the exposed places. The overall energy required for recording the information, that is to say for creating holes in the recording layer, originates only partly from the layer and is provided for the remaining part by the exothermal decomposition of the endothermal material present in the auxiliary layer. Briefly, the writing energy is partly provided by chemistry. This may result in an extra saving of laser energy of 50% or more. The required amount of laser energy is small and is, for example $10^{-8}$ to $10^{-10}$ Joule per recorded image point, the image point having an area of $1-3 \mu um^2$.

The small amount of laser energy enables the use of lasers of comparatively low power, for example, solid-state lasers having a power of 1–10 mW. As compared with the usually used gas lasers, said lasers have much smaller dimensions and a considerably simpler construction. The solid-state lasers can hence be incorporated much more easily and in addition are considerably cheaper.

The endothermal material preferably has an energy content released upon decomposition of at least $10^{-10}$ Joule per $\mu um^3$. Materials having such an energy content are, for example, compounds which show an explosive combustion or deflagration. These include inter alia pyrotechnical compounds and types of powder. Such materials are sufficiently described in literature, for example, in "Chemie 1973" R. Meyer Weinheim Verlag, so that those skilled in the art can easily make a choice on the basis of the desired energy content and, for example, the ignition temperature. It should be borne in mind that when a material having a very low ignition temperature is used, for example lower than 150°–200° C., the required laser energy becomes smaller, it is true, but on the other hand, due to the larger sensitivity of such a material, extra precautions have to be taken in the processing thereof, which is a cost-price-increasing factor.

According to Applicants, good results are achieved if the endothermal material used is nitrocellulose having a nitrogen content of at least 11% or a mixture hereof with nitroglycerine.

A suitable mixture contains from 5 to 25% by weight of nitroglycerine calculated on the quantity of nitrocellulose.

Nitrocellulose or mixtures with nitroglycerine are polymeric substances which may serve as a binder for the dye present in the auxiliary layer. A suitable auxiliary layer consists, for example, of 80% by weight of nitrocellulose and 20% by weight od dye, for example, N,N'dioctadecyl rhodamine.

A suitable endothermal material is furthermore a picrate, for example, the pictric acid salt of the dye used in the auxiliary layer.

The image points formed in the recording layer are arranged in an information track in the form of a spiral or built up from concentric circles. The velocity of writing is high. Per image point an exposure time is used which varies from $10^{-6}$ to $10^{-8}$ sec., for example, an exposure time of $5.10^{-7}$ sec.

The usual recording layers having a reflecting power with respect to laser light are used in the recording element embodying the invention. For example, layers of metal or metal alloys may be used which generally have a larger reflecting power and can be provided in a simple manner by vapor deposition. Examples hereof are layers of Bi, Te, Ind, Sn, Cu, Al, Pt, Au, Rh, As, Sb, Ge, Se, Ga.

Particularly suitable are metals having a high reflection and a low melting point, for example, Cd, Sn, Tl, Ind, Bi and amalgams.

The thickness of the recording layer is preferably 100–1000 Å. If desired, the layer may be provided with a protective layer of lacquer.

Figure 2:
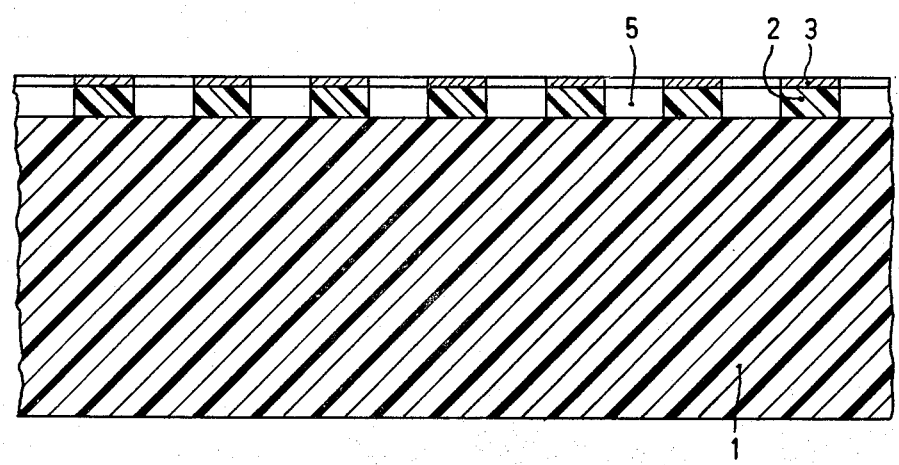

The invention will now be described in greater detail with reference to the following embodiments and the accompanying drawing, in which FIG. 1 is a cross-sectional view of an information-recording element prior to exposure, and FIG. 2 is a cross-sectional view of the element shown in FIG. 1 after information has been recorded.

EXAMPLE 1

Reference numeral 1 in FIG. 1 denotes a 1 mm thick substrate of polymethylmethacrylate (plexiglass) which is provided with a layer 2 of dye (Rhodamine 6G) dissolved in polyether. Layer 2 has been provided by mixing 10 ml of a 0.8% solution of the polyether in methanol with 50 ml of Rhodamine 6G, shaking the mixture until all the dye has been dissolved, and pouring the resulting solution, after filtration on the substrate plate. The substrate plate 1 having the above-mentioned solution is rotated by means of a centrifuge at a velocity of 1000 rpm., the dye solution being distributed uniformly on the substrate surface. After evaporating the solvent, the layer (or film) 2 is obtained which has a thickness of 1300 Å and an optical density of 0.56 at a wavelength of 530 n.m.

The dye-containing layer 2 is decolorized over a part of the surface by exposure to a xenon lamp. The optical density in the decolorized places is 0.005 at a wavelength of 530 nm.

A 400 Å thick bismuth film 3 is vapor-deposited on and abuts the layer 2 and herewith the information-recording element according to the invention as shown in FIG. 1 is obtained. It is to be noted that the above-mentioned decolorization serves exclusively for experimental comparison, as will be described hereinafter. Of course, normally no colorization spots are present in the element embodying the invention.

The above-described element is exposed to pulsating laser light ($\lambda = 530$ nm) via the substrate (pulse time 500 ns) in the direction denoted by arrows 4. It has been found that a laser light power of 4.2 mW was necessary in the decolorized places to form a hole having a diameter of 1 $\mu$m in the bismuth layer 3 and the underlying dye layer 2. In the non-decolorized places, 3,2 nW is necessary to make a hole of the same dimensions. An energy saving of 24% is obtained by using a dye-containing layer 2.

After the exposure, the situation shown in FIG. 2 is reached. In FIG. 2 the same reference numerals as in FIG. 1 are used for the same components. Reference numeral 5 denotes the hole having a diameter of 1 $\mu$m formed in the bismuth layer 3 and auxiliary layer 2.

EXAMPLE 2

In a corresponding manner as described in the above example, a 1 mm thick plate 1 (FIG. 1) of polymethylmethacrylate was provided on one side with an auxiliary layer 2 containing Rhodamine 6G dissolved in polyether. The thickness of the auxiliary layer was 600 Å with an optical density of 0.53. A part of the surface of the auxiliary layer was decolorized by means of a xenon lamp. In the decolorized spots the optical density was 0.002 at a wavelength of 530 nm. By means of a vapor deposition process, a 400 Å thick bismuth film 3 (FIG. 1) was provided on the auxiliary layer and the resulting element was then exposed to pulsating laser light via the substrate. The pulse time was 500 ns. The wavelength of the laser light was 530 nm. It was found that in the decolorized places a laser power of 4.0 mW was required to form a hole 5 (FIG. 2) of 1$\mu$m diameter in layers 2 and 3. 2.7 mW was necessary for the colored spots so that a saving of 33% was obtained.

What is claimed is:

1. An improved information-recording element in which information can be written and read optically, which comprises a transparent substrate, an auxiliary layer provided on the substrate, an information-recording layer which is provided on and abuts the auxiliary layer and having a reflecting power with respect to a laser light beam used for writing or reading, the improvement being characterized in that the auxiliary layer is a laser light-absorbing dye-containing layer.

2. An information-recording element as claimed in claim 1, characterized in that the auxiliary layer has a laser light absorption of from 20 to 80% and a maximum thickness of 2500 Å.

3. An information-recording element as claimed in claim 2, characterized in that the auxiliary layer has a laser light absorption of from 20 to 50%.

4. An information-recording element as claimed in claim 1, characterized in that the auxiliary layer comprises an organic dye or a solution or dispersion of an organic dye in a polymeric binder.

5. An information-recording element as claimed in claim 4, characterized in that polymeric binder is formed by a radiation-polymerized lacquer on the basis of radiation-sensitive monomers and/or oligomers in which a dye is dissolved or finely divided.

6. An information-recording element as claimed in claim 1, characterized in that the auxiliary layer also comprises an endothermal material.

* * * * *